United States Patent
Cai et al.

(10) Patent No.: US 11,770,479 B2
(45) Date of Patent: *Sep. 26, 2023

(54) SYSTEMS AND METHODS FOR ESTABLISHING A CALL CONNECTION

(71) Applicant: RINGCENTRAL, INC., Belmont, CA (US)

(72) Inventors: QingHua Cai, Xiamen (CN); JianWei Chen, Xiamen (CN); WeiMing Li, Xiamen (CN); Christopher van Rensburg, Portland, OR (US); Martin Arastafar, Redwood City, CA (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,080

(22) Filed: Feb. 1, 2022

(65) Prior Publication Data

US 2022/0159126 A1    May 19, 2022

Related U.S. Application Data

(63) Continuation of application No. 17/072,152, filed on Oct. 16, 2020, now Pat. No. 11,330,110, which is a
(Continued)

(51) Int. Cl.
*H04M 3/00* (2006.01)
*H04M 5/00* (2006.01)
(Continued)

(52) U.S. Cl.
CPC .......... *H04M 7/003* (2013.01); *G06F 3/0482* (2013.01); *G06F 3/0484* (2013.01);
(Continued)

(58) Field of Classification Search
CPC ............ H04M 3/42263; H04M 11/00; H04M 2203/551; H04M 2203/6009;
(Continued)

(56) References Cited

U.S. PATENT DOCUMENTS

| | | | |
|---|---|---|---|
| 7,571,238 B1 * | 8/2009 | Reeves | H04L 47/70 370/468 |
| 8,358,765 B1 | 1/2013 | Whitten et al. | |

(Continued)

FOREIGN PATENT DOCUMENTS

CN    103957199 A    7/2014

OTHER PUBLICATIONS

International Search Report and Written Opinion, dated Mar. 15, 2021, issued in PCT Application No. PCT/CN2020/095770 (9 pages).

*Primary Examiner* — Kharye Pope
(74) *Attorney, Agent, or Firm* — Finnegan, Henderson, Farabow, Garrett & Dunner LLP

(57) ABSTRACT

Systems and methods for establishing call connection in response to user action, the method including receiving a first user action from a user associated with making a call connection, wherein the first user action comprises any of copying at least part of a phone number, pasting at least part of the phone number, or inputting at least part of the phone number. The method also includes determining one or more call recipients based on the first user action. The method also includes establishing one or more silent call connections based on the determined one or more call recipients, wherein each of the one or more silent call connections comprises a call connection with a predetermined parameter so that there are no incoming call indicators on one or more devices associated with the one or more call recipients.

22 Claims, 7 Drawing Sheets

Related U.S. Application Data continuation of application No. PCT/CN2020/095770, filed on Jun. 12, 2020.

(51) Int. Cl.
*H04L 12/66* (2006.01)
*H04M 7/00* (2006.01)
*H04M 1/247* (2021.01)
*H04M 1/253* (2006.01)
*G06F 3/0482* (2013.01)
*G06F 3/0484* (2022.01)
*H04M 1/72469* (2021.01)

(52) U.S. Cl.
CPC ....... *H04M 1/2477* (2013.01); *H04M 1/2535* (2013.01); *H04M 1/72469* (2021.01); *H04M 7/006* (2013.01)

(58) Field of Classification Search
CPC ........... H04M 3/42365; H04M 3/5191; H04M 1/72563; H04M 1/72583; H04M 3/42; H04M 3/465; H04M 15/63; H04M 15/83; H04M 15/8351; H04M 1/2535; H04M 1/2746; H04M 2201/42; H04L 51/10; H04L 61/2503; H04L 65/1069; H04L 65/1083; H04L 65/4015; H04L 65/604; H04L 65/1006; H04L 12/185; H04W 4/02; H04W 4/16; H04W 84/042; H04W 4/06; H04W 68/005; H04W 76/10; H04W 84/12; H04W 68/00; H04W 88/02; H04W 88/06; G06F 16/9535; G06F 3/0482; G06F 16/248; G06F 3/04842; G06F 16/24575; G06F 16/9038; G06F 8/38; G06F 16/2455; G06F 16/738; G06F 16/9536; G06F 16/9538

USPC ...................................... 370/352; 379/221.08
See application file for complete search history.

(56) References Cited

U.S. PATENT DOCUMENTS

| | | | |
|---|---|---|---|
| 9,178,773 B1* | 11/2015 | Tassone | G06F 3/0484 |
| 9,560,210 B1 | 1/2017 | Noble, Jr. | |
| 2002/0191557 A1 | 12/2002 | Chow et al. | |
| 2002/0191635 A1 | 12/2002 | Chow et al. | |
| 2006/0035632 A1* | 2/2006 | Sorvari | H04M 1/7243 |
| | | | 455/418 |
| 2006/0240877 A1* | 10/2006 | Filiba | H04M 1/72451 |
| | | | 455/567 |
| 2007/0147600 A1* | 6/2007 | Stahlman | H04M 3/465 |
| | | | 379/266.07 |
| 2007/0224997 A1 | 9/2007 | Florkey et al. | |
| 2007/0275737 A1* | 11/2007 | Sakaniwa | H04M 1/2745 |
| | | | 455/461 |
| 2007/0280179 A1 | 12/2007 | Van Belle et al. | |
| 2010/0318486 A1 | 12/2010 | Stafford et al. | |
| 2013/0223247 A1 | 8/2013 | Bae et al. | |
| 2013/0303133 A1* | 11/2013 | Sansalone | H04W 76/15 |
| | | | 455/414.1 |
| 2014/0011546 A1 | 1/2014 | Bender et al. | |
| 2015/0195695 A1* | 7/2015 | Geiger | H04M 1/72454 |
| | | | 455/404.1 |
| 2016/0072943 A1* | 3/2016 | Wang | H04M 3/436 |
| | | | 455/401 |
| 2016/0165032 A1 | 6/2016 | Chang | |
| 2017/0006147 A1 | 1/2017 | Plumb | |
| 2017/0085706 A1* | 3/2017 | Kim | H04W 4/16 |
| 2017/0357912 A1 | 12/2017 | Hindi et al. | |
| 2018/0081993 A1 | 3/2018 | Musukula et al. | |
| 2019/0313229 A1 | 10/2019 | Chiang et al. | |
| 2020/0162600 A1 | 5/2020 | Lau et al. | |
| 2020/0351406 A1 | 11/2020 | Patel et al. | |
| 2020/0389551 A1* | 12/2020 | Vaughn | H04M 3/42059 |

* cited by examiner

SYSTEMS AND METHODS FOR ESTABLISHING A CALL CONNECTION

CROSS-REFERENCE TO RELATED APPLICATIONS

This application is a continuation application of, and claims the benefit of priority to U.S. patent application Ser. No. 17/072,152, filed on Oct. 16, 2020, which is a continuation application of, and claims the benefit of priority to International Application No. PCT/CN2020/095770, filed on Jun. 12, 2020. The entire contents of all of the above-referenced applications are hereby incorporated by reference.

TECHNICAL FIELD

The present disclosure generally relates to systems and methods for establishing a call connection, including, for example, establishing a call connection based on a user action.

BACKGROUND

Devices for establishing a call connection allow users to place calls to one another in response to a user pressing a call button or taking some other action associated with initiating a call. These devices often take a few seconds to establish a call connection when a user makes an outbound call. This time is used to establish a connection between the user making the call and the user receiving the call. Such devices, however, introduce unwanted delays in the call connection process, leaving callers waiting while the connection is being established.

SUMMARY

In some embodiments, a method for establishing a call connection in response to a user action is provided that includes receiving a first user action from a user associated with making a call connection, wherein the first user action comprises any of copying at least part of a phone number, pasting at least part of the phone number, or inputting at least part of the phone number. The method also includes determining one or more call recipients based on the first user action. The method also includes establishing one or more silent call connections based on the determined one or more call recipients, wherein each of the one or more silent call connections comprises a call connection with a predetermined parameter so that there are no incoming call indicators associated with the one or more call recipients.

In some embodiments, a device for establishing a call connection in response to a user action comprises at least one non-transitory computer readable medium containing instructions; and at least one processor configured to execute the instructions to cause the device to: receive a first user action from a user associated with making a call connection, wherein the first user action comprises any of copying at least part of a phone number, pasting at least part of the phone number, or inputting at least part of the phone number; determine one or more call recipients based on the first user action; and establish one or more silent call connections based on the determined one or more call recipients, wherein each of the one or more silent call connections comprises a call connection with a predetermined parameter so that there are no incoming call indicators on one or more devices associated with the one or more call recipients.

Additional features and advantages of the disclosed embodiments will be set forth in part in the following description, and will be apparent from the description, or may be learned by practice of the embodiments. The features and advantages of the disclosed embodiments may be realized and attained by the elements and combinations set forth in the claims.

It is to be understood that the foregoing general description and the following detailed description are examples and explanations only, and are not restrictive of the invention, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
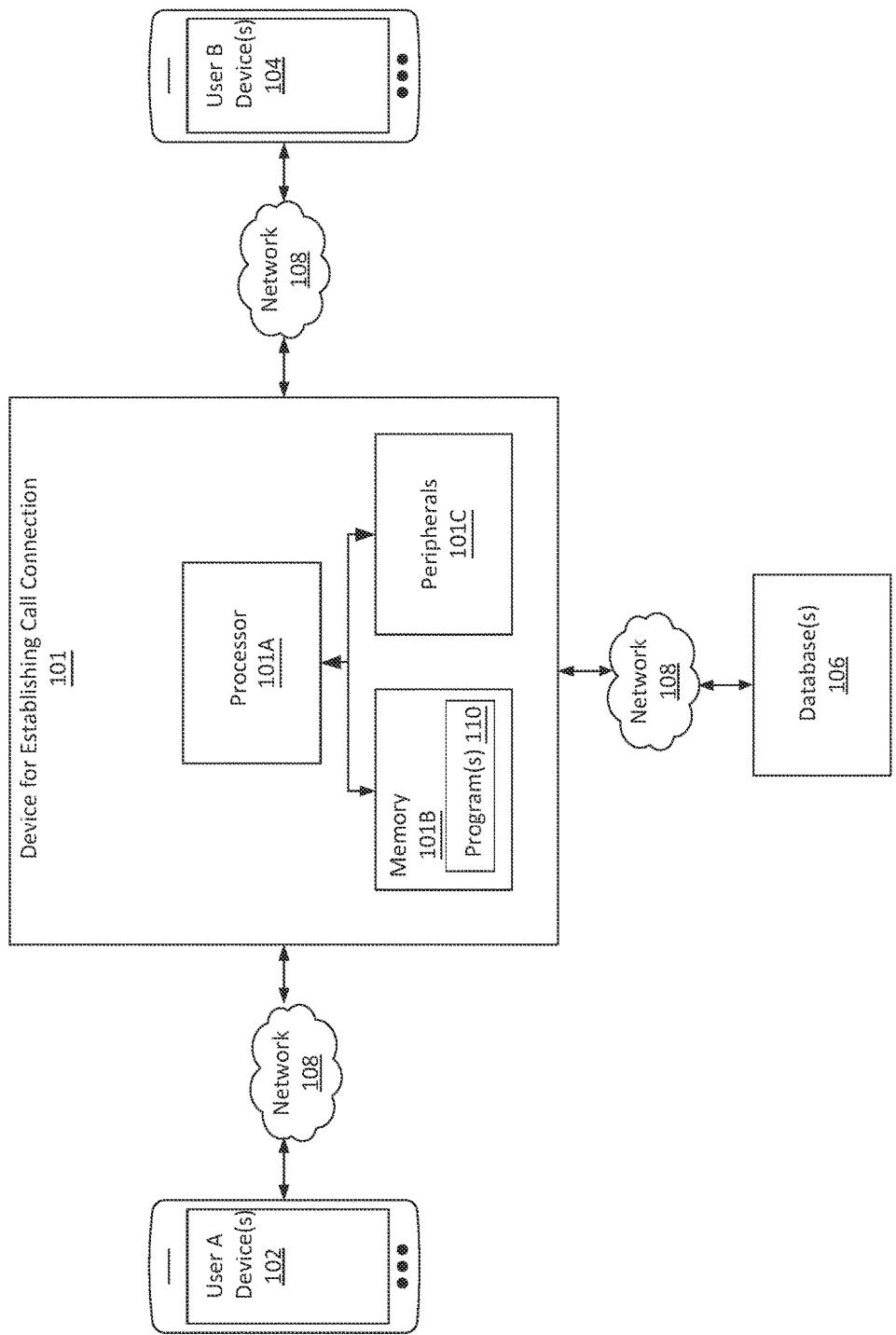
FIG. 1 illustrates a block diagram of an exemplary system including a device for establishing a call connection according to the present disclosure.

Reference will now be made in detail to example embodiments, including those illustrated in the accompanying drawings. The following description refers to the accompanying drawings in which the same numbers in different drawings represent the same or similar elements unless otherwise represented. The implementations set forth in the following description of the embodiments do not represent all possible implementations consistent with the invention. Instead, they are merely examples of apparatuses and methods consistent with aspects related to the invention as recited in the appended claims. Particular aspects of the present disclosure are described in greater detail below.

Modern day devices for establishing a call connection often suffer from unnecessary delays when a user makes an outbound call. These devices do not establish a call connection until the caller presses a dial button to initiate an active call. There is therefore an unpleasant delay between the time the user takes the action to initiate the active call and the time when the call connection is established.

Consistent with embodiments of the present disclosure, systems and methods are provided for establishing a call connection in response to a user action. With embodiments of the present disclosure, when a user copies, pastes, or begins typing part of a phone number or a full phone number, the device for establishing a call connection establishes one or more silent call connections before the user completes an action to initiate an active call. Consistent with the present disclosure, the device for establishing a call connection may also respond to the user copying, pasting or typing digits of the phone number. The device may determine which of the silent call connections corresponds with the updated phone number and terminate any connections which do not.

In some embodiments, the device for establishing a call connection may also respond to the user copying or pasting a phone number. The device for establishing a call connection may also respond to the user typing additional digits of the original phone number or beginning to type a different phone number. The device may then determine which of the silent call connections already made correspond with the updated phone number and terminate any connections which do not.

In some embodiments, the device for establishing a call connection may also respond to the user taking an action to initiate an active call. The device for establishing a call connection may then establish an active call connection from one of the silent call connections.

By way of example, calls may be made through a voice over internet protocol (VoIP) connection or any other type of connection between two or more users. Calls may include any kind of communication where there is some amount of time between the user identifying the target of communication and choosing to initiate the communication. Furthermore, a phone number may be any sequence of symbols that uniquely identifies a single recipient or a group of recipients associated with that sequence of symbols for the purpose of communicating with them.

In some embodiments, there may be a user profile associated with the user that contains information for determining potential call recipients. For example, the user profile may contain a call history, contacts, an organization to which the user belongs, or other information associated with the user that may be beneficial to determining potential call recipients. The device for establishing a call connection may use the information contained in the user profile to determine likely call recipients based on a part of the phone number the user has copied, pasted, or typed.

In some embodiments, the device for establishing a call connection may use machine learning algorithms either generally or associated with a specific user and specific user profile to determine potential call recipients. For example, a machine learning algorithm may be used that determines that on a certain day the user places an outbound call to a particular recipient. Upon beginning to type the recipients' phone number on the certain day, the device for establishing a call connection may therefore determine that the user is likely to make an outbound call to the particular recipient. The device for establishing a call connection may therefore establish a silent call connection to the particular recipient before the user ever takes an action to initiate an active call.

FIG. 1 is a block diagram of an exemplary system 100, for performing one or more operations consistent with disclosed embodiments. In some embodiments, system 100 includes a device 101 for establishing a call connection according to the present disclosure. In some embodiments, system 100 includes one or more user A devices 102, one or more user B devices 104, one or more databases 106, and a network 108. The number and arrangement of components in FIG. 1 are for purposes of illustration and not intended to be limiting to the embodiments of the present disclosure. It will also be appreciated, for example, that device 101 for establishing call connection may be part of a user A device 102 or part of a user B device 104. As shown, device 101 for establishing call connection comprises a processor 101A, a memory 101B and peripherals 101C. Memory 101B may include one or more storage devices configured to store instructions executed by processor 101A to perform functions related to disclosed embodiments. For example, memory 101B may be configured with one or more software instructions, for performing one or more operations when executed by processor 101A. The disclosed embodiments are not limited to separate programs or computers configured to perform dedicated tasks. For example, memory 101B may include a single program 110 for performing the functions of device 101, or multiple programs 110 for performing the functions of device 101. In certain embodiments, memory 101B may store sets of instructions or programs 110 for establishing a call connection in response to a user action by receiving a first user action from a user associated with making a call connection, determining one or more call recipients based on the user action, and establishing one or more silent call connections based on the determined one or more call recipients.

Additionally, device 101 may be connected to a database 106. Furthermore, device 101 may be connected to one or more user devices such as user A device 102 and user B device 104. Device 101 may communicate with user A device 102 and user B device 104 through peripherals 101C, over network 108, or through other components not shown here. Device 101, user A device 102 and user B device 104 may be configured to communicate with each other over network 108. Network 108 may comprise any type of computer networking arrangement configured to provide communications or exchange data, or both, between device 101, user A device 102, and user B device 104. For example, network 108 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among device 101, user A device 102, and user B device 104. Network 108 may also include a public switched telephone network ("PSTN") and/or a wireless cellular network. Network 108 may be a secured network or unsecured network. In some embodiments, device 101, user A device 102, and user B device 104 may communicate directly through a dedicated communication link(s). The connection between device 101 and user devices 102 and 104 may be physical or remote. Device 101 is configured to connect and relay information between a number of user devices 102 and 104 for the purpose of establishing call connections.

In some embodiments, device 101 may be configured to send and receive a data feed from each of user devices 102 and 104. The data feed may comprise information identifying user devices 102 and 104 with a given user and information identifying user actions on user devices 102 and 104. The data feed may be sent before, during, or after a silent call connection is established. The data feed may also be sent before, during, or after an active call connection is established. The data feed may be implemented using methods familiar to one of ordinary skill in the art, such as VoIP, or the data feed may be implemented using other methods.

In some embodiments, user A device 102 and user B device 104 may include I/O devices (not shown) that allow user A device 102 and user B device 104 to send and receive information or allow interactions with user A or user B or another device. For example, I/O devices may include various input/output devices, such as a keyboard, a mouse-type device, a gesture sensor, an action sensor, a physical button, switch, microphone, touchscreen panel, stylus, etc., that may be manipulated by user A or user B to input information using user A device 102 or user B device 104, respectively. I/O devices may also include an audio output device, such as a speaker configured to provide sound and audio feedback to user A or user B operating user A device 102 or user B device 104, respectively. In some embodiments, I/O devices may include a light emitting component, such as an LED or other component capable of providing a visible signal to user A or user B. I/O devices may also include haptic output devices, to provide haptic feedback to user A or user B. I/O devices may also include one or more communication modules (not shown) for sending and receiving information from other components in system 100 by, for example, establishing wired or wireless connectivity between user A device 102, user B device 104, device 101, and network 108. I/O devices may include radio frequency, infrared, or other near-field communication interfaces, for communicating with other devices associated with network 108 or user A or user B. Exemplary communication modules of I/O devices may include, for example, a short-range or near field wireless communication modem, a Wi-Fi™ communication modem, or a cellular communication modem. I/O devices may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni-directional or bi-directional communication technology known to one of ordinary skill in the art may be implemented in the user A device 102 or user B device 104, to exchange information with device 101, user A device 102, user B device 104, or database 106 via network 108.

In some embodiments, device 101 may be configured to send and receive a data feed from database 106. The data feed may comprise information identifying each of user devices 102 and 104 with a given user and information relating to the given users respectively associated with user devices 102 and 104. Database 106 may be stored on device 101 or may be stored remotely and accessed through peripherals 101C or other components not shown. Database 106 may be configured to store information relating to a given user associated with a user device, such as a user profile. Although device 101 is shown separate from user devices 102, 104 and database 106, database 106 may be part of device 101 and/or operations performed by device 101 may be performed by other devices, including either or both of user devices 102, 104. Device 101 may be a part of one or both of user devices 102 and 104.

In some embodiments, user A device 102 or user B device 104 or both, may be capable of performing functions performed by device 101. For example, user A device 102 or user B device 104 or both may comprise a processor and a memory which may include a single program 110 for performing the functions of device 101, or multiple programs 110 for performing the functions of device 101. In certain embodiments, user A device 102 or user B device 104 or both may comprise a processor and a memory to store sets of instructions or programs 110 for establishing a call connection in response to a user action by receiving a first user action from a user associated with making a call connection, determining one or more call recipients based on the user action, and establishing one or more silent call connections based on the determined one or more call recipients.

Figure 2:
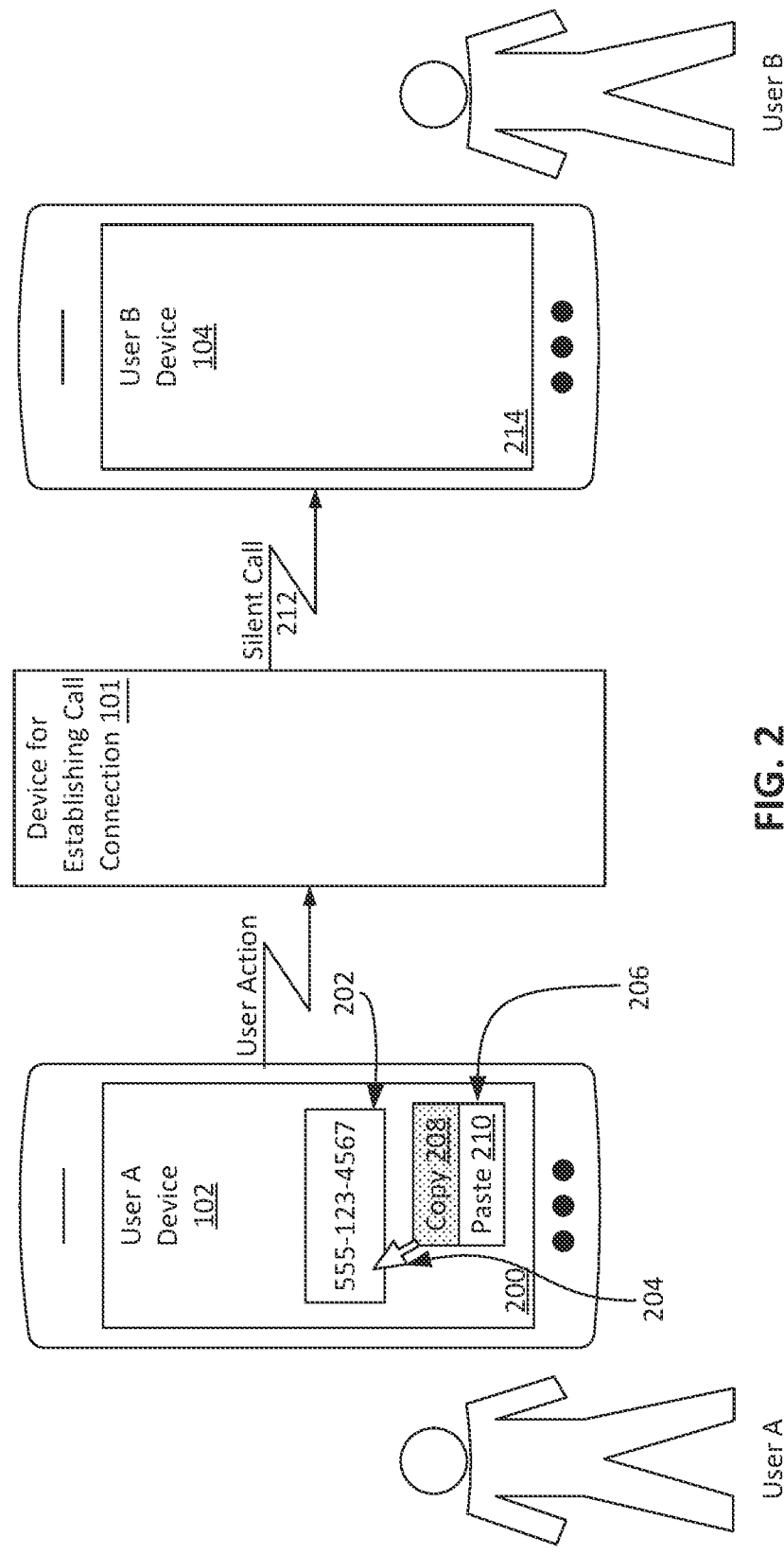
FIG. 2 illustrates an example of an environment for a device for establishing a call connection, consistent with embodiments of the disclosure.

FIG. 2 illustrates an example of an environment of system 100, in which a device for establishing a call connection may operate. The arrangement and number of components are for purposes of illustration and not limiting for any purpose. It will be appreciated, for example, that any number of users and user devices may be used to implement the example embodiment. It will also be appreciated, for example, that device 101 may be part of user A device 102 or part of user B device 104. As shown, device 101 is provided for establishing a call connection for user A, who is associated with user A device 102, and who interacts with user A device 102 to take an action.

In the example of FIG. 2, a phone number 202 is displayed on a display screen 200 associated with user A device 102. Upon receiving a selection input from user A, through a Graphical User Interface (GUI), as indicated by a mouse arrow 204, user A device 102 displays a menu 206. In the example of FIG. 2, menu 206 features an option to copy 208 and an option to paste 210. In some embodiments, a phone number may be displayed on the GUI, for example, as a digital business card. User A may select the displayed phone number by clicking on it or selecting the phone number using a touch screen, or any other type of input. Device 101 may then detect a first user action, where user A selects the phone number. Device 101 may then establish a silent connection, for example call 212 to user B device 104 via network 108. By way of example, a silent call connection may be a call connection that shows no indication through user A device 102 and/or user B device 104 that a call connection is established. Device 101 may then detect a second user action, by which user A may confirm that she/he wants to establish a connection with the selected phone number. Device 101 may then convert the silent connection to an active call.

In some embodiments, as shown in the example in FIG. 2, user A has selected the option to copy 208. In other embodiments, user A may input a phone number using an alternate method, for example, inputting a phone number by typing, via voice recognition, or selecting a contact from a dropdown menu or a database, etc. Upon receiving the user selection input to copy 208, device 101 then establishes a silent call 212 to user B device 104 via network 108. In some embodiments, the selection input may be in the form of a voice command or other method of user A indicating to user A device 102 their intention to establish an active call. By way of example, a silent call connection may be a call connection that shows no indication through user A device 102 and/or user B device 104 that a call connection is established. There is therefore no active call screen or ringing displayed on user A device 102 and/or no incoming call screen or ringing displayed on user B device 104. Thus, in the example of FIG. 2, display screen 200 associated with user A device 102 and a display screen 214 associated with user B device 104 both show no indication that a call connection is being established.

For convenience of illustration, device 101 is shown in FIG. 2 as being physically separate from user A device 102 or user B device 104. However, device 101 could be incorporated into either of user A device 102 or user B device 104.

Figure 3:
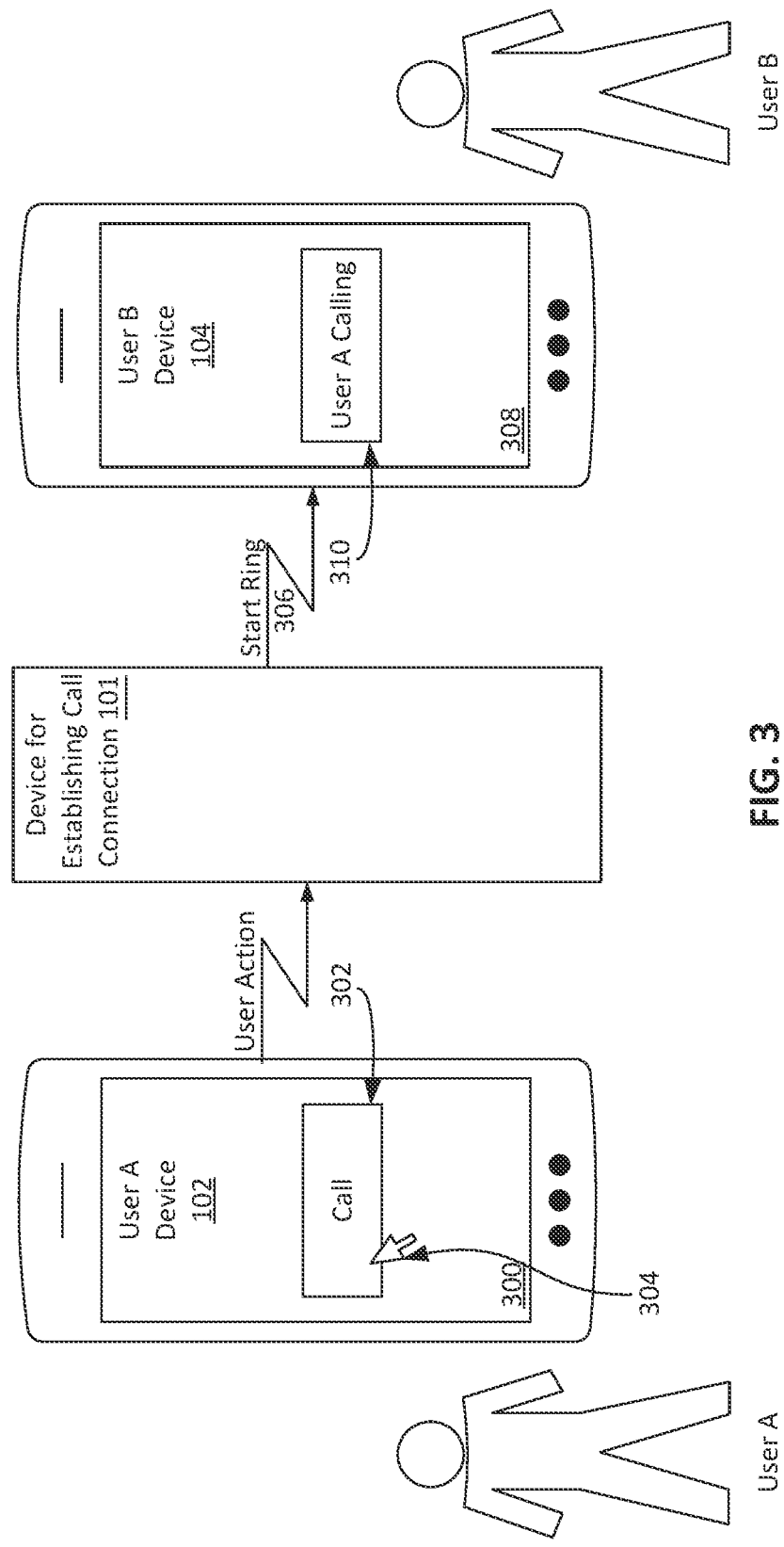
FIG. 3 illustrates another example of an environment for a device for establishing a call connection, consistent with embodiments of the disclosure.

FIG. 3 illustrates an example of an environment of system 100, for a device for establishing a call connection, consistent with embodiments of the disclosure. The arrangement and number of components are for purposes of illustration and not limiting for any purpose. It will be appreciated, for example, that any number of users and user devices may be used to implement the example embodiment. As shown in FIG. 3, device 101 is provided for establishing a call connection for user A, who is associated with user A device 102, and who interacts with user A device 102 to take an action.

As shown in FIG. 2, user A pastes (210) the phone number. As shown in FIG. 3, user A, associated with user A device 102, selects a call button 302, to establish a call to the pasted phone number. It will be appreciated that the user action can be any action in which user A uses user A device 102 to establish an active call. Upon receiving a selection input from user A, as indicated by a mouse arrow 304, device 101 may begin establishing the silent call connection between user A device 102 and user B device 104. In some embodiments, user A device 102 or user B device 104 may be able to receive selection by a keyboard, a mouse-type device, a gesture sensor, an action sensor, a physical button, switch, microphone, touchscreen panel, stylus, etc., that may be manipulated by user A or user B, respectively. Device 101 may then establish an active call connection between user A device 102 and user B device 104. By way of example, an active call connection may be a call connection that does show an indication to user A device 102 and user B device 104 that a call connection is established. For example, a display screen 300 associated with user A device 102 and a display screen 308 associated with user B device 104 may show an indication while the call is being established, as shown in FIG. 3. In some embodiments, display screen 300 may also show an indication that a call connection has been established. There may, therefore, be an active call screen or ringing on user A device 102, and ringing 306 or incoming call screen 310 on user B device 104.

Figure 4:
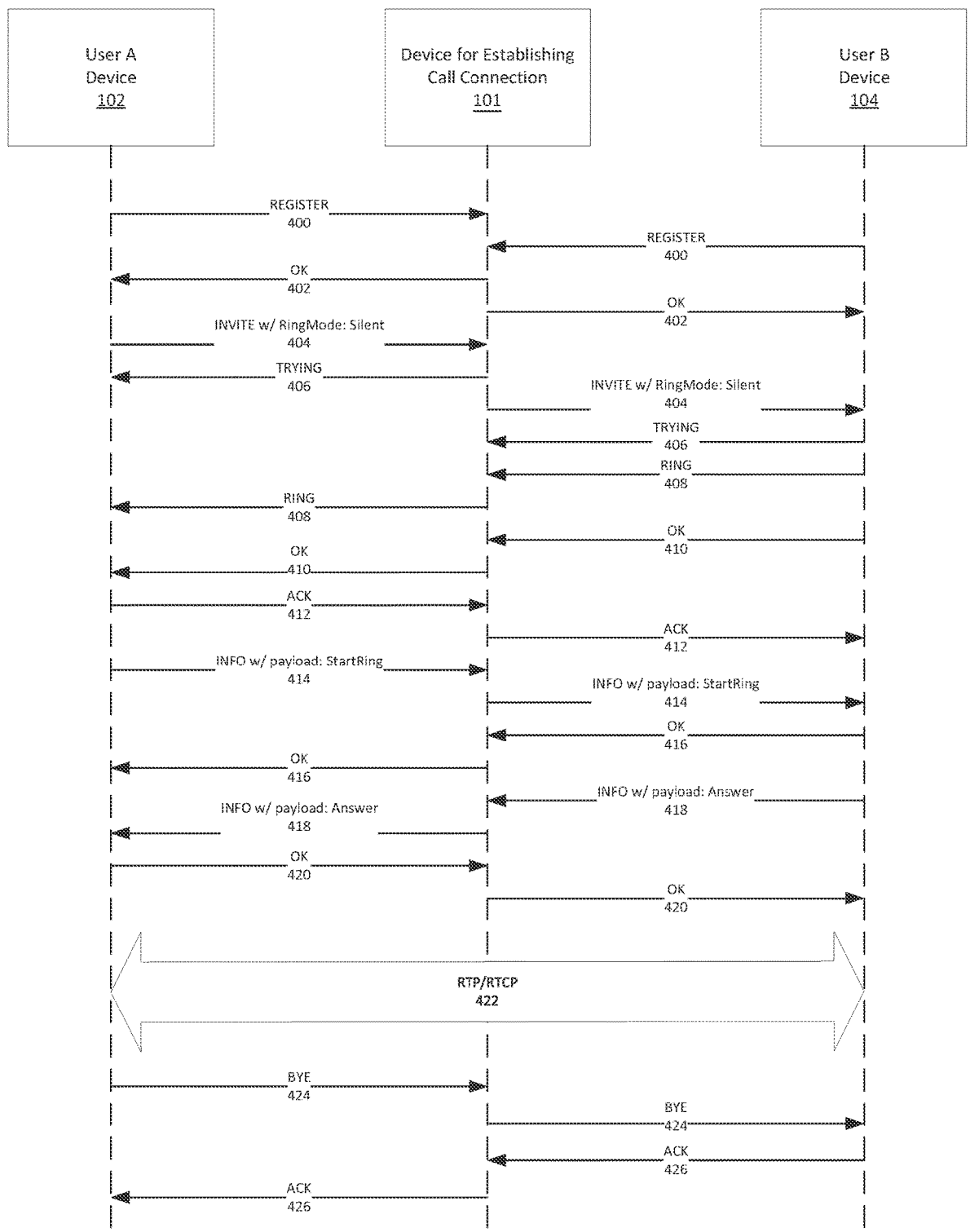
FIG. 4 illustrates an example of an information flow diagram for a method for establishing a call connection, consistent with embodiments of the disclosure.

FIG. 4 illustrates an example of an information flow diagram for a method for establishing a call connection, consistent with embodiments of the disclosure. Although the information flow diagram in FIG. 4 is associated with Session Initiation Protocol (SIP), Real-time Transport Protocol (RTP), and Real-time Transport Control Protocol (RTCP), it will be appreciated that any number of different protocols may be used. One of ordinary skill in the art will be familiar with the protocols used. For example, H.323, Media Gateway Control Protocol (MGCP), H.248, Secure Real-time Transport Protocol (SRTP), Session Description Protocol (SDP), Inter-Asterisk eXchange (IAX), Extensible Messaging and Presence Protocol (XMPP), Skype Protocol, other protocols, and any combination thereof may be used.

As shown in FIG. 4, user A device 102 and user B device 104 send a register request 400 to device 101. Register request 400 may include, for example, contacts associated with user A device 102 and user B device 104. Although not shown in FIG. 4, device 101 may then send a request to user A device 102 and user B device 104 for a user identification and password. Upon receiving a valid user identification and password, device 101 may then send an OK response 402 to user A device 102 and user B device 104 indicating that they are properly registered.

As shown in FIG. 4, user A device 102 then sends an invite request 404 with a special header to device 101. This invite request 404 may be sent in response to a user action performed on user A device 102, such as copying, pasting, or typing part of a phone number or a complete phone number. The special header on the invite request 404 is a predetermined parameter that indicates that a silent call connection rather than an active call connection will be made. In response to the invite request 404 with the special header, device 101 tries, at step 406, to establish a call connection with user A device 102. If a call connection is successfully established, device 101 relays the invite request 404 with the special header to user B device 104. Device 101 tries, at step 406, to establish a call connection with user B device 104. If a call connection is successfully established, user B device 104 will send a ring response 408 to device 101 which will then be relayed to user A device 102. It should be noted that, because the header indicates that a silent call connection is being established, no audible ringing or other indication of an active call will occur on user A device 102 or user B device 104.

As shown in FIG. 4, in response to the ring, user B device 104 may automatically accept the call connection and send an OK response 410 to device 101, which may then relay the OK response 410 to user A device 102. User A device 102 may then send an acknowledgement response 412 to device 101, which may then relay the acknowledgement response 412 to user B device 104. Next, when user A presses a call button to establish an active call, user A device 102 may send an information packet 414 to device 101 indicating that the call is being made active. Device 101 may then relay the information packet 414 to user B device 104, causing user B device 104 to begin ringing. User B device 104 may then send an OK response 416 to device 101, which may then relay the OK response 416 to user A device 102.

As shown in FIG. 4, if user B answers the call, user B device 104 sends an information packet 418 to device 101 indicating the call is accepted. Device 101 then relays the information packet 418 to user A device 102, causing the active call to be established. User A device 102 then sends an OK response 420 to device 101, which then relays the OK response 420 to user B device 104. Next, there is an exchange of media information which may be in the form of RTP payloads 422. One of the users may then end the phone call. For example, user A may end the phone call, causing user A device 102 to send a good-bye response 424 to device 101. Device 101 then relays the good-bye response 424 to user B device 104, causing the active call to be terminated. In response, user B device 104 sends an acknowledgement response 426 to device 101, which then relays the acknowledgement response 426 to user A device 102.

Figure 5:
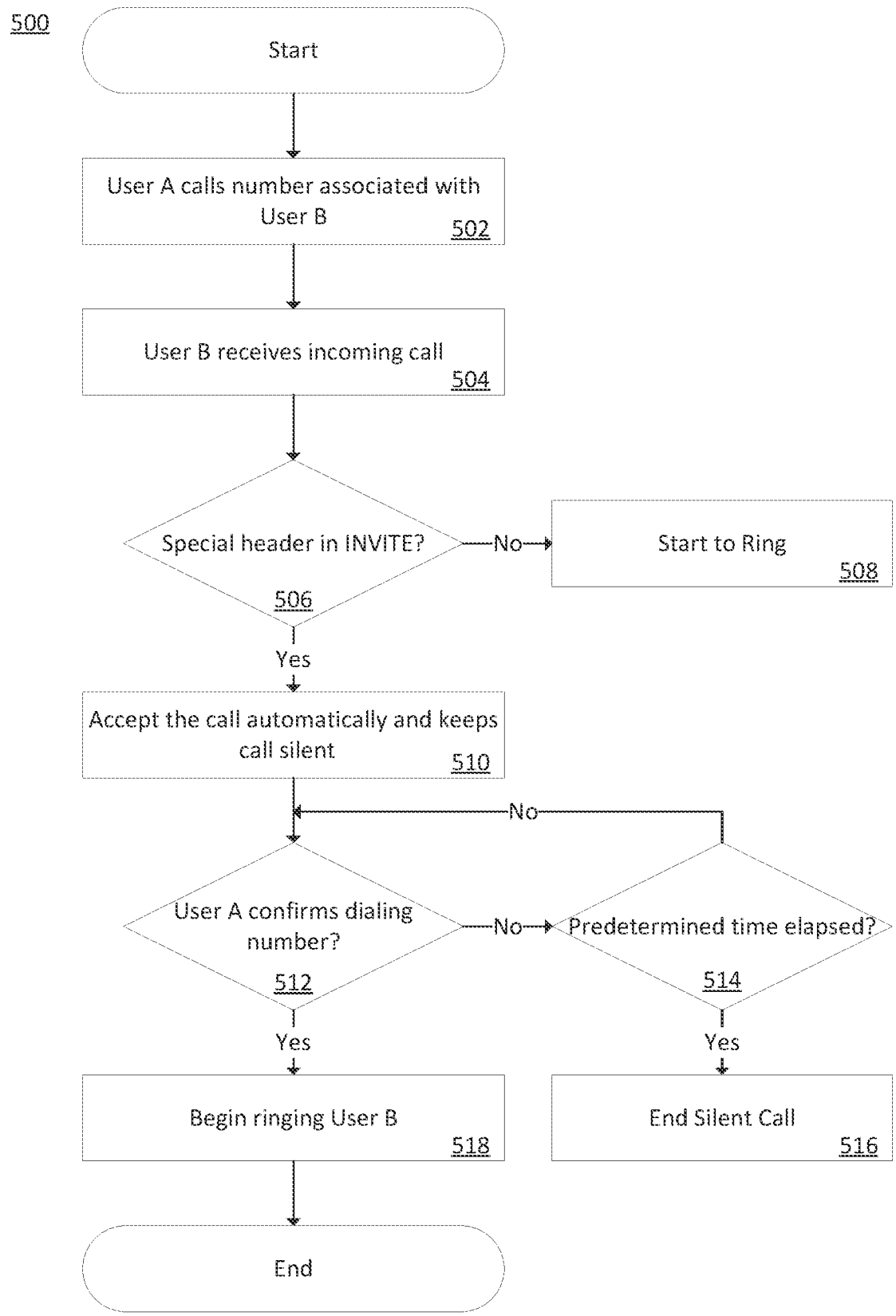
FIG. 5 illustrates a flowchart for an example of a method of establishing a call connection, consistent with embodiments of the disclosure.

FIG. 5 illustrates a flowchart for an example of a method of establishing a call connection. Method 500 may be implemented with any of the herein disclosed devices for establishing call connection (see, e.g., FIGS. 1, 2, and 3). With reference to FIG. 5, in step 502, user A begins to enter in, using a GUI displayed on user A device 102, digits of the phone number associated with user B. For example, user A may copy, paste, or type part of a phone number, and the device 101 may attempt to establish a silent call connection to user B device 104.

In step 504, user B device 104 receives an incoming call. For example, user B device 104 receives the attempt to establish a silent call connection from device 101.

In step 506, device 101 determines if there is a special header in an invite request. For example, device 101 may determine whether there is a header in the invite request corresponding with a silent call connection.

In step 508, if device 101 determines in step 506 that there is no special header in the invite request, user B device 104 will start to ring. For example, if the call being made does not have a special header in the invite request corresponding with a silent call connection, an active call connection will be established causing an indication to both user A and user B on user A device 102 and user B device 104, respectively.

In step 510, if it is determined in step 506 that there is a special header in the invite request, user B device 104 will automatically accept the call and keep it silent. For example, if the call being made has a special header in the invite request corresponding with a silent call connection, a silent call connection will be established, causing no indication to either user A or user B on user A device 102 or user B device 104, respectively, that a call connection has been established.

In step 512, device 101 determines if user A confirms dialing the number associated with user B. For example, device 101 may determine whether user A has pressed the call button to initiate an active call.

In step 514, if device 101 determines in step 512 that user A has not confirmed dialing the number associated with user B, device 101 determines if a predetermined time has elapsed. For example, device 101 may determine that user A has not pressed the call button to initiate an active call and will then check to see if a predetermined amount of time has elapsed from the establishment of the silent call connection. In some embodiments, the determination may not be made based on time elapsed but rather on some other metric for determining whether user A still intends to call user B. For example, the determination could be based on user A deleting digits from the phone number, pressing a button to completely clear the entered phone number, pasting in a different phone number, pressing an end call button or other equivalent cancel button, closing an application associated with making a call, not entering a required number of digits to complete the phone number, entering an invalid phone number, receiving an inbound call and accepting the call, etc.

In some embodiments, if device 101 determines in step 514 that the predetermined time has not elapsed, device 101 may return to step 512 and again determine whether user A has confirmed dialing the number associated with user B.

In step 516, if device 101 determines in step 514 that the predetermined time has elapsed, device 101 may end the silent call connection between the devices associated with user A and user B. For example, device 101 may determine that the predetermined time has elapsed from the establishment of the silent call connection and may, therefore, determine that user A no longer intends to call user B and thus terminate the call connection.

In step 518, if device 101 determines in step 512 that user A has confirmed dialing the number associated with user B, device 101 begins ringing user B. For example, device 101 determines that user A has pressed the call button to initiate an active call and will therefore make the silent call connection an active call connection, causing an indication to both user A and user B on user A device 102 and user B device 104, respectively.

In one embodiment, either user A device 102 or user B device 104 may perform functions associated with device 101, as discussed above with reference to FIG. 5. In such a situation, the efficiency of establishing a connection may be further improved by establishing direct communication between user A device 102 and user B device 104.

Figure 6:
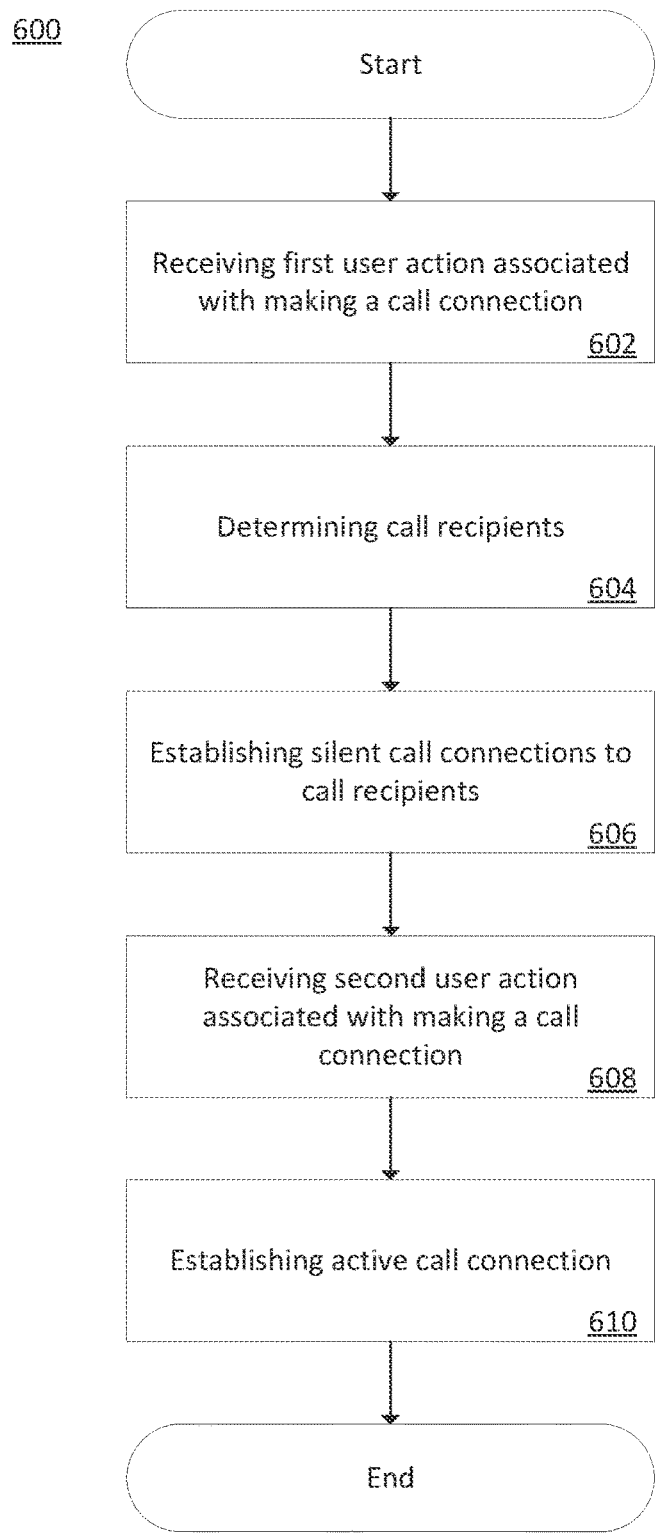
FIG. 6 illustrates another flowchart for an example of a method of establishing a call connection, consistent with embodiments of the disclosure.

FIG. 6 illustrates another flowchart for a method of establishing a silent call connection. Method 600 may be implemented with any of the herein disclosed devices for establishing call connection (see, e.g., FIGS. 1, 2, and 3). Generally, as shown in FIG. 6, the steps of method 600 include: receiving a first user action associated with making a call connection (step 602), determining call recipients (step 604), establishing silent call connections to call recipients (step 606), receiving a second user action associated with making a call connection (step 608), and establishing an active call connection (step 610).

In step 602, device 101 receives a first user action associated with making a call connection. For example, device 101 may receive a user action comprising copying, pasting, or typing at least part of a phone number.

In step 604, device 101 determines call recipients. For example, device 101 may determine that a whole phone number has been copied, pasted, or typed and may therefore determine a single call recipient. In some embodiments, device 101 may determine that only part of a number has been copied, pasted, or typed. Device 101 may, therefore, predict one or more complete phone numbers that the user may intend to call. As an example, device 101 may determine that the user has copied, pasted, or typed nine digits of a ten-digit phone number. Device 101 may therefore determine all ten possibilities of the ten-digit phone number as possible call recipients. In some embodiments, device 101 may match the nine digits of the phone number to a single contact associated with the user's user profile and determine only that number as a possible call recipient. In other embodiments, device 101 may match the nine digits of the phone number to a phone number in the call history associated with the user's user profile and determine only that number as a possible call recipient. In still other embodiments, device 101 may determine that only three of the ten possibilities of ten-digit phone numbers are assigned phone numbers and therefore determine that only the three assigned phone numbers are possible call recipients.

In some embodiments, machine learning algorithms may be used to determine call recipients. For example, a machine learning algorithm may be trained on call data from many users and be able to determine that a user associated with a certain organization or type of organization is likely to call a user associated with another certain organization or type of organization. The machine learning algorithm may be able to determine, for example, that a user associated with a manufacturer of a good will likely be in contact with suppliers of the good's components and will likely be in contact with distributors of the good's components. In other embodiments, a machine learning algorithm may be trained on a user's profile and be able to use the habits of the user to determine call recipients. For example, a user may call a certain number on a given day of the week. The machine learning algorithm may then correlate a portion of a phone number with the call history of the user and select a single call recipient. One of ordinary skill in the art will understand that many different machine learning prediction algorithms may be used, both supervised and unsupervised. For example, linear regression, logistic regression, classification and regression trees, principle component analysis, Bayesian machine learning, K-nearest neighbors, and other machine learning algorithms and combinations thereof may be used.

In some embodiments, there may be a portion of a phone number significant enough to trigger device 101 to determine call recipients. For example, device 101 may only determine call recipients if at least an area code is copied, pasted, or typed. In other embodiments, device 101 may determine call recipients if the number of possible call recipients falls below a given threshold.

In step 606, device 101 establishes silent call connections to call recipients. For example, device 101 sends invite requests to all of the potential call recipients using a special header to indicate that the call is silent. The silent call connection may not show as an active call screen or ringing on the user side and may not show as an incoming call screen or ringing on the side of the one or more call recipients.

In step 608, device 101 receives a second user action associated with making a call connection. For example, device 101 may receive an action comprising the user pressing a call button. In some embodiments, the action may not be the user pressing a call button but may be some other action associated with the user making an active call connection.

In step 610, device 101 establishes an active call connection. For example, device 101 sends information packets to the call recipient causing an active call screen or ringing on the user side and an incoming call screen or ringing on the side of the call recipient.

Figure 7:
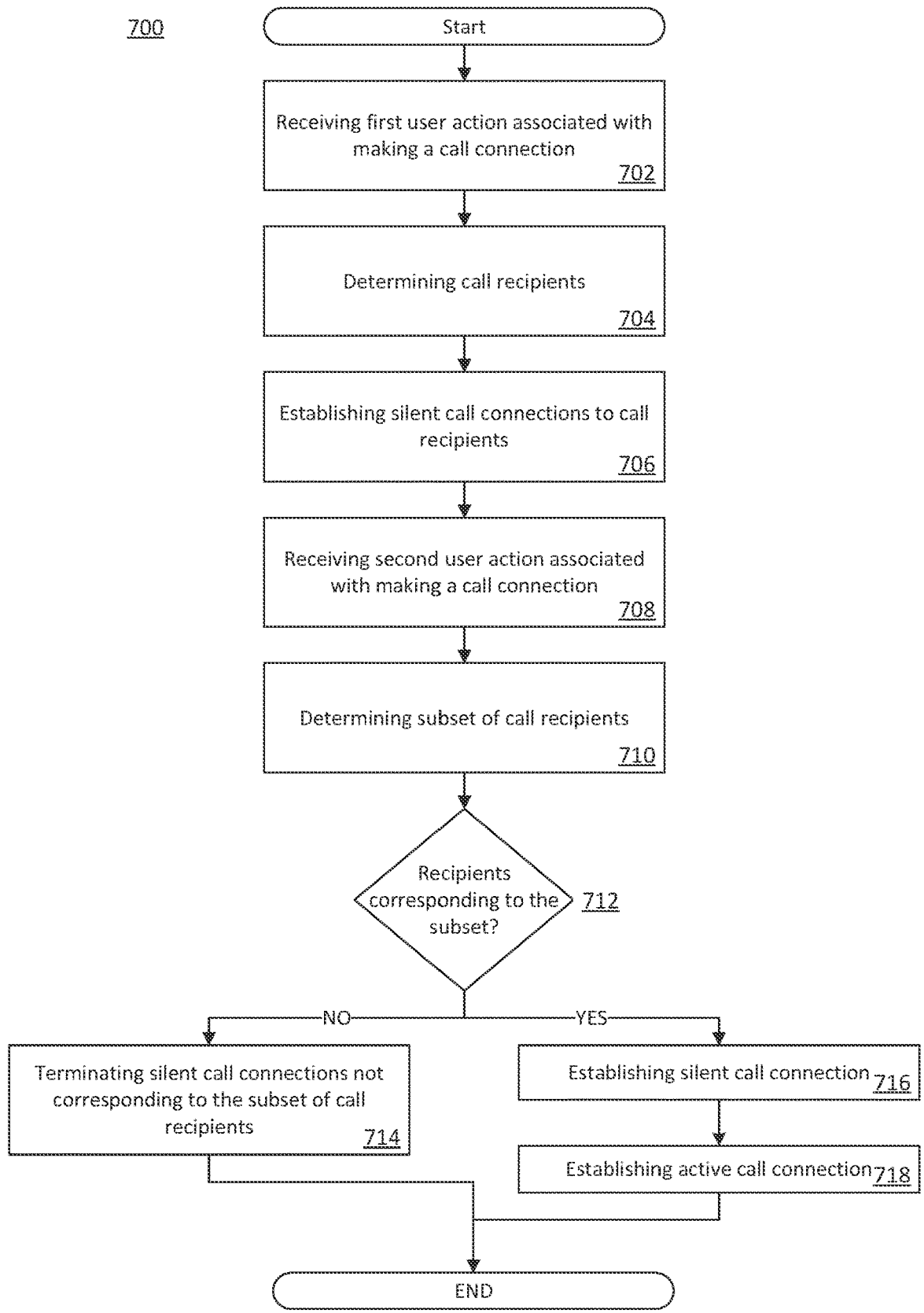
FIG. 7 illustrates another flowchart for an example of a method of establishing a call connection, consistent with embodiments of the disclosure.

FIG. 7 illustrates a flowchart for another example of a method of establishing a call connection. Method 700 may be implemented with any of the herein disclosed devices for establishing call connection (see, e.g., FIGS. 1, 2, and 3). Generally, as shown in FIG. 7, the steps of the method 700 include: receiving a first user action associated with making a call connection (step 702), determining call recipients (step 704), establishing silent call connections to call recipients (step 706), receiving a second user action associated with making a call connection (step 708), determining a subset of call recipients (step 710), determining if the recipients correspond to the subset (step 712), terminating silent call connections not corresponding to the subset of call recipients (step 714), establishing silent call connections to the recipients corresponding to the determined subset (716), and establishing an active call connection (step 718).

In step 702, device 101 receives a first user action associated with making a call connection. For example, device 101 may receive a user action comprising copying, pasting, or typing at least part of a phone number.

In step 704, device 101 determines call recipients. For example, device 101 may determine that a whole phone number has been copied, pasted, or typed and may therefore determine a single call recipient. In some embodiments, device 101 may determine that only part of a number has been copied, pasted, or typed. Device 101 may therefore predict one or more numbers that a user may intend to call. As an example, device 101 may determine that the user has copied, pasted, or typed nine digits of a ten-digit phone number. Device 101 may therefore determine all ten possibilities of the ten-digit phone number as possible call recipients. In some embodiments, device 101 may match the nine digits of the phone number to a single contact associated with the user's user profile and determine only that number as a possible call recipient. In other embodiments, device 101 may match the nine digits of the phone number to a phone number in the call history associated with the user's user profile and determine only that number as a possible call recipient. In still other embodiments, device 101 may determine that only three of the ten possibilities of ten-digit phone numbers are assigned phone numbers and therefore determine that only the three assigned phone numbers are possible call recipients.

In some embodiments, machine learning algorithms may be used to determine call recipients. For example, a machine learning algorithm may be trained on call data from many users and be able to determine that a user associated with a certain organization or type of organization is likely to call a user associated with another certain organization or type of organization. The machine learning algorithm may be able to determine, for example, that a user associated with a manufacturer of a good will likely be in contact with suppliers of the good's components and will likely be in contact with distributors of the good's components. In other embodiments, a machine learning algorithm may be trained on a user's profile and be able to use the habits of the user to determine call recipients. For example, a user may call a certain number on a given day of the week. The machine learning algorithm may then correlate a portion of a phone number with the call history of the user and select a single call recipient. One of ordinary skill in the art will understand that many different machine learning prediction algorithms may be used, both supervised and unsupervised. For example, linear regression, logistic regression, classification and regression trees, principle component analysis, Bayesian machine learning, K-nearest neighbors, and other machine learning algorithms and combinations thereof may be used.

In some embodiments, there may be a portion of a phone number significant enough to trigger device 101 to determine call recipients. For example, device 101 may only determine call recipients if at least an area code is copied, pasted, or typed. In other embodiments, device 101 may determine call recipients if the number of possible call recipients falls below a given threshold.

In step 706, device 101 establishes silent call connections to call recipients. For example, device 101 sends invite requests to all of the potential call recipients using a special header to indicate that the call is silent. While headers are used in this and other examples, other elements may be used as alternatives for indicating that a call is intended to be silent. The silent call connection may not show as an active call screen or ringing on the user side and may not show as an incoming call screen or ringing on the side of the one or more call recipients.

In step 708, device 101 receives a second user action associated with making a call connection. For example, device 101 may receive a user action comprising copying, pasting, or typing at least part of a phone number. In some embodiments, the second user action may comprise the user continuing to copy, paste, or type a phone number. In other embodiments, the user action may comprise the user copying, pasting, or typing a different phone number.

In some embodiments, the first user action may comprise of user A beginning to input a digit or digits of a phone number on user A device 102 and the second user action may comprise user A continuing to input a second digit or additional digits of a phone number. Device 101 may receive the first user action and determine that there are enough digits for initiating multiple silent call connections. Device 101 may then receive the second user action, for example, additional digits of the phone number, a contact name, etc. Device 101 may then determine that there is enough data to establish some of the silent call connections, based on the received second user action. Device 101 may then start terminating invalid silent calls when it receives the second user action.

In some embodiments, the second user action may include selection of a phone number by user A from a dropdown menu or a checkbox where a list of filtered options may be displayed after user A inputs first one or two digits or letters for selecting the phone numbers on the user interface of user A device 102. In some embodiments, the second user action may be user A entering a portion of a phone number significant enough to trigger device 101 to determine call recipients. For example, device 101 may only determine call recipients if at least an area code is copied, pasted, or typed. In other embodiments, device 101 may determine call recipients if the number of possible call recipients falls below a given threshold. In other embodiments, device 101 may invalidate all the silent call connections to clear the entry, or delete digits back to the point where there are too many possible call recipients, i.e., above the given threshold. In some embodiments, the second user action may be user A entering a few digits of the phone number and device 101 may look up the phone number in a database to find a contact which user A recently contacted. If a contact is matched, then device 101 may use the entire phone number of the matched contact to make a silent call. In some embodiments, the second user action may be user A selecting a phone number from a displayed list of previously dialed phone numbers, after inputting a threshold number of digits. For example, the threshold number of digits may be determined based on stored contacts, previously dialed phone numbers, area codes, recently accessed contacts, etc.

In step 710, device 101 determines a subset of call recipients. For example, device 101 determines that a whole phone number has been copied, pasted, or typed and may therefore determine a single call recipient from the one or more possible call recipients. As an example, device 101 may determine that a user who had originally typed eight digits of a ten-digit phone number has typed a ninth digit. Device 101 may therefore determine all ten possibilities of the ten-digit phone number as a subset of call recipients of the original one hundred possibilities. In some embodiments, device 101 may match the nine digits of the phone number to a single contact associated with the user's user profile and determine only that number as a possible call recipient. In other embodiments, device 101 may match the nine digits of the phone number to a phone number in the call history associated with the user's user profile and determine only that number as a possible call recipient. In still other embodiments, device 101 may determine that only three of the ten possibilities of ten-digit phone numbers are assigned phone numbers and therefore determine that only the three assigned phone numbers are possible call recipients.

In step 712, device 101 determines if the possible call recipients belong to the determined subset of recipients. In step 714 (step 712—no), device 101 terminates the silent call connections not corresponding to the subset of call recipients. For example, device 101 terminates any silent call connections established in step 706 that are not in the determined subset of call recipients from step 710. As an example, device 101 may determine that a user who had originally typed eight digits of a ten-digit phone number has typed a ninth digit. Device 101 may therefore determine all ten possibilities of the ten-digit phone number as a subset of call recipients of the original possibilities. Device 101 may therefore terminate the calls to the other possibilities not included in the subset of call recipients. Likewise, device 101 may determine that a user who had originally typed nine digits of a ten-digit phone number has typed a tenth digit. Device 101 therefore terminates the calls to the other nine possible call recipients not included in the subset of call recipients.

In step 716 (step 712—yes), device 101 establishes a silent call connection to call recipients corresponding to the subset of call recipients. For example, device 101 sends invite requests to all of the potential call recipients using a special header to indicate that the call is silent. As an example, device 101 may determine that a user who had originally typed eight digits of a ten-digit phone number has typed a ninth digit. Device 101 may therefore determine all ten possibilities of the ten-digit phone number as a subset of call recipients of the original possibilities and establish silent call connections to the ten recipients. The silent call connection may not show as an active call screen or ringing on the user side and may not show as an incoming call screen or ringing on the side of the one or more call recipients.

In step 718, device 101 establishes an active call connection based on the second user action. For example, device 101 sends information packets to the call recipient causing an active call screen or ringing on the user side and an incoming call screen or ringing on the side of the call recipient. As discussed above, device 101 receives a second user action associated with making a call connection. As an example, device 101 may determine that a user who had originally typed nine digits of a ten-digit phone number has typed a tenth digit. Device 101 may then establish an active call to the recipient.

Embodiments of the present disclosure may be implemented through any suitable combination of hardware, software, and/or firmware. Modules and components of the present disclosure may be implemented with programmable instructions implemented by a hardware processor. In some embodiments, a non-transitory computer-readable storage medium including instructions is also provided, and the instructions may be executed by a processor device for performing the above-described steps and methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units. For example, there may be a single physical computer for the administrator server, the matching server, and other components.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed example embodiments. However, many variations and modifications can be made to these embodiments. Accordingly, although specific terms are employed, they are used in a generic and descriptive sense only and not for purposes of limitation.

What is claimed is:

1. A method for establishing a communication, comprising:
    establishing a silent call connection with a call recipient determined based on a partial phone number before a user initiates a call connection,
    wherein the silent call connection comprises a predetermined parameter such that there is no incoming call indicator.
2. The method of claim 1, further comprising:
    receiving a user action adding a digit to the partial phone number;
    determining a different call recipient based on the user action; and
    terminating the silent call connection.
3. The method of claim 1, further comprising:
    receiving a user action for initiating the call connection; and
    establishing an active call connection based on the user action and the silent call connection.
4. The method of claim 1, wherein the call recipient is further determined based on a user profile associated with the user.
5. The method of claim 1, wherein the call recipient is further determined based on a machine learning algorithm.
6. The method of claim 2, wherein determining the different call recipient is based on a user profile associated with the user.
7. The method of claim 2, wherein determining the different call recipient is based on a machine learning algorithm.
8. The method of claim 1, wherein the partial phone number comprises an area code.
9. The method of claim 2, further comprising:
    determining whether the call recipient is associated with an assigned phone number, and
    wherein determining the different call recipient is further based on determining whether the call recipient is associated with the assigned phone number.
10. A communication device, comprising:
    a non-transitory computer readable medium containing instructions; and
    a processor configured to execute the instructions to cause the device to:
        establish a silent call connection with a call recipient determined based on a partial phone number entered by a user before the user takes a subsequent action to initiate a call connection,
        wherein the silent call connection comprises a predetermined parameter such that there is no incoming call indicator.
11. The device of claim 10, wherein the processor is further configured to execute the instructions to cause the device to:
    receive a user action adding a digit to the partial phone number;
    determine a different call recipient based on the user action; and
    terminate the silent call connection.
12. The device of claim 10, wherein the processor is further configured to execute the instructions to cause the device to:
    receiving a user action for initiating the call connection; and
    establishing an active call connection based on the user action and the silent call connection.
13. The device of claim 10, wherein the call recipient is further determined based on a user profile associated with the user.
14. The device of claim 10, wherein the call recipient is further determined based on a machine learning algorithm.
15. The device of claim 11, wherein determining the different call recipient is based on a user profile associated with the user.
16. The device of claim 11, wherein determining the different call recipient is based on a machine learning algorithm.
17. The device of claim 11, wherein the processor is further configured to execute the instructions to cause the device to determine whether the call recipient is associated with an assigned phone number, and wherein determining the different call recipient is further based on determining whether the call recipient is associated with the assigned phone number.
18. A method for establishing a communication, comprising:
    establishing a silent call connection with a call recipient determined based on a partial phone number entered by a user before the user initiates a call connection, wherein the silent call connection comprises a predetermined parameter such that there is no incoming call indicator; and
    converting the silent call connection into an active call connection when the user initiates the call connection.
19. The method of claim 18, further comprising:
    receiving a user action adding a digit to the partial phone number, and wherein converting the silent call connection into the active call connection is in response to receiving the user action.
20. The method of claim 19, further comprising:
    establishing another silent call connection with another call recipient determined based on the partial phone number before the user initiates the call connection; and
    terminating the other silent call connection in response to converting the silent call connection into the active call connection.
21. The communication device of claim 10, wherein when the user takes the subsequent action to initiate the call connection, the processor is configured to execute further instructions to cause a device, in the silent call connection with the communication device, to generate the incoming call indicator.

22. The method of claim 18, wherein converting the silent call connection into the active call connection includes generating the incoming call indicator on a device in the silent call connection.

* * * * *